United States Patent
Matsumoto

(10) Patent No.: US 12,316,160 B2
(45) Date of Patent: May 27, 2025

(54) UNINTERRUPTIBLE POWER SUPPLY APPARATUS

(71) Applicant: TOSHIBA MITSUBISHI-ELECTRIC INDUSTRIAL SYSTEMS CORPORATION, Tokyo (JP)

(72) Inventor: Jun Matsumoto, Chuo-ku (JP)

(73) Assignee: TMEIC Corporation, Tokyo (JP)

( * ) Notice: Subject to any disclaimer, the term of this patent is extended or adjusted under 35 U.S.C. 154(b) by 0 days.

(21) Appl. No.: 18/560,232

(22) PCT Filed: Apr. 7, 2022

(86) PCT No.: PCT/JP2022/017259
§ 371 (c)(1),
(2) Date: Nov. 10, 2023

(87) PCT Pub. No.: WO2023/195127
PCT Pub. Date: Oct. 12, 2023

(65) Prior Publication Data
US 2024/0243605 A1 Jul. 18, 2024

(51) Int. Cl.
*H02J 9/06* (2006.01)
(52) U.S. Cl.
CPC .................. *H02J 9/062* (2013.01)
(58) Field of Classification Search
CPC ...................................... H02J 9/062
USPC ..................................... 307/66, 64
See application file for complete search history.

(56) References Cited

U.S. PATENT DOCUMENTS

| | | | | |
|---|---|---|---|---|
| 10,461,576 B2* | 10/2019 | Toyoda | ............... | H02M 7/5395 |
| 2017/0117731 A1 | 4/2017 | Shimada et al. | | |
| 2017/0302105 A1 | 10/2017 | Toyoda et al. | | |
| 2021/0036632 A1* | 2/2021 | Hayashi | ................ | H02M 3/157 |
| 2021/0257852 A1* | 8/2021 | Toyoda | ................... | H02J 9/062 |

FOREIGN PATENT DOCUMENTS

| | | |
|---|---|---|
| JP | 56-89634 U1 | 7/1981 |
| JP | 4-67738 A | 3/1992 |
| JP | 4-117143 A | 4/1992 |
| JP | 2015-208171 A | 11/2015 |
| WO | WO 2016/092613 A1 | 6/2016 |

OTHER PUBLICATIONS

Written Opinion of International Searching Authority issued May 31, 2022, in PCT/JP2022/017259 (with English Translation), 9 pages.
International Search Report issued May 31, 2022 in PCT/JP2022/017259 filed on Apr. 7, 2022, 2 pages.

* cited by examiner

*Primary Examiner* — Michael R. Fin
(74) *Attorney, Agent, or Firm* — Oblon, McClelland, Maier & Neustadt, L.L.P.

(57) ABSTRACT

An uninterruptible power supply apparatus includes an operation unit for setting a second reference voltage, a computation unit that calculates a first reference voltage higher than the set second reference voltage and lower than a maximum value of the first reference voltage, a first reference voltage generation unit that generates the first reference voltage calculated by the computation unit, and a second reference voltage generation unit that generates the second reference voltage set by the operation unit. Thus, a voltage of a DC line can be made lower than the maximum value of the first reference voltage for improved efficiency of the uninterruptible power supply apparatus.

5 Claims, 6 Drawing Sheets

UNINTERRUPTIBLE POWER SUPPLY APPARATUS

TECHNICAL FIELD

The present disclosure relates to an uninterruptible power supply apparatus, and particularly, to an uninterruptible power supply apparatus that converts alternating-current (AC) power supplied from an AC power supply into direct-current (DC) power, converts the DC power into AC power, and supplies the AC power to a load.

BACKGROUND ART

For example, WO 2016/092613 (PTL 1) discloses an uninterruptible power supply apparatus including a first power converter that converts AC power supplied from an AC power supply into DC power and supplies the DC power to a DC line, a second power converter that provides and receives the DC power between the DC line and a power storage device, a third power converter that converts the DC power received from the DC line into AC power and supplies the AC power to the load, and a controller that controls the first to third power converters.

During normal operation of the AC power supply, the controller controls the first power converter such that a DC voltage of the DC line is equal to a first reference voltage, controls the second power converter such that a terminal-to-terminal voltage of the power storage device is equal to a second reference voltage, and controls the third power converter to output an AC voltage.

During power failure of the AC power supply, the controller causes the first power converter to stop operating, controls the second power converter such that the DC voltage of the DC line is equal to the first reference voltage, and controls the third power converter to output the AC voltage.

CITATION LIST

Patent Literature

PTL 1: WO 2016/092613

SUMMARY OF INVENTION

Technical Problem

Such an uninterruptible power supply apparatus needs to have a voltage (i.e., first reference voltage) of the DC line that is higher than a voltage (i.e., second reference voltage) of the power storage device. The DC voltage (i.e., second reference voltage) applied to the power storage device in a floating charge of the power storage device differs depending on the type of power storage device.

Also, the terminal-to-terminal voltage (i.e., second reference voltage) of the power storage device needs to be raised periodically for an equalizing charge, depending on the type of power storage device. Moreover, the voltage (i.e., first reference voltage) of the DC line needs to be higher than the voltage twice an amplitude of an AC voltage in order to supply a sinusoidal AC voltage to the load.

Conventionally, in order to satisfy all the conditions above, the first reference voltage has been set for a maximum value of the DC voltage (i.e., a maximum value of the first reference voltage) that the first power converter can output stably. However, raising the voltage (i.e., first reference voltage) of the DC line increases a switching loss of each transistor of the first to third power converters, reducing the efficiency of the uninterruptible power supply apparatus.

Therefore, a main object of the present disclosure is to provide an uninterruptible power supply apparatus that can have improved efficiency.

Solution to Problem

An uninterruptible power supply apparatus according to the present disclosure includes first to third power converters, first to third control units, a setting unit, a computation unit, and first and second reference voltage generation units. The first power converter converts AC power supplied from an AC power supply into DC power and supplies the DC power to a DC line. The second power converter provides and receives DC power between the DC line and a power storage device. The third power converter converts DC power received from the DC line into AC power and supplies the AC power to a load.

The first control unit controls the first power converter such that a DC voltage of the DC line is equal to a first reference voltage during normal operation of the AC power supply, and causes the first power converter to stop operating during power failure of the AC power supply. The second control unit controls, during normal operation of the AC power supply, the second power converter such that a terminal-to-terminal voltage of the power storage device is equal to a second reference voltage, and during power failure of the AC power supply, controls the second power converter such that the DC voltage is equal to the first reference voltage. The third control unit controls the third power converter to output an AC voltage.

The setting unit is provided for setting the second reference voltage. The computation unit calculates the first reference voltage higher than the second reference voltage set by the setting unit and lower than a maximum value of the first reference voltage. The first reference voltage generation unit generates the first reference voltage calculated by the computation unit and supplies the first reference voltage to the first control unit. The second reference voltage generation unit generates the second reference voltage set by the setting unit and supplies the second reference voltage to the second control unit.

Advantageous Effects of Invention

The uninterruptible power supply apparatus according to the present disclosure generates the first reference voltage higher than the second reference voltage set by the setting unit and lower than the maximum value of the first reference voltage, and provides the first reference voltage to the first control unit. Therefore, the first reference voltage can be set to a value smaller than the maximum value, leading to improved efficiency of the uninterruptible power supply apparatus.

DESCRIPTION OF EMBODIMENTS

Figure 1:
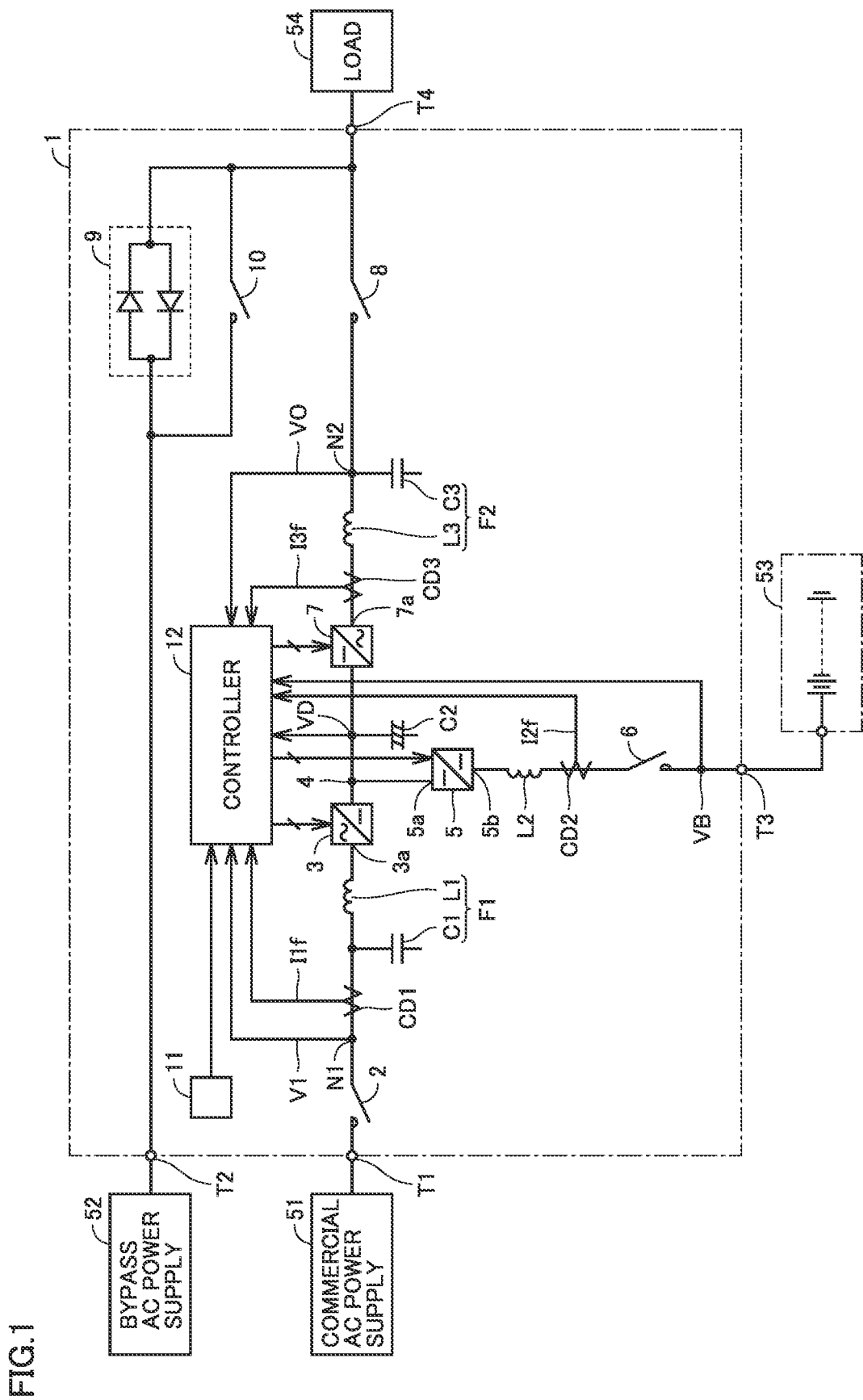
FIG. 1 is a circuit block diagram showing a configuration of an uninterruptible power supply apparatus according to an embodiment of the present disclosure.

FIG. 1 is a circuit block diagram showing a configuration of an uninterruptible power supply apparatus 1 according to an embodiment of the present disclosure. In FIG. 1, uninterruptible power supply apparatus 1 includes an AC input terminal T1, a bypass input terminal T2, a battery terminal T3, and an AC output terminal T4. AC input terminal T1 receives AC power of commercial frequency from a commercial AC power supply 51. Bypass input terminal T2 receives AC power of commercial frequency from a bypass AC power supply 52. Bypass AC power supply 52 may be a commercial AC power supply or a power generator.

Battery terminal T3 is connected to a battery (power storage device) 53. Battery 53 stores DC power. Battery 53 may be a lead storage battery or a lithium-ion battery. Alternatively, an electric double layer capacitor or a flywheel may be connected in place of battery 53.

In the present embodiment, battery 53 is a lead storage battery including a plurality of series-connected cells. Such a battery 53 needs a floating charge and an equalizing charge. AC output terminal T4 is connected to a load 54. Load 54 is driven by AC power supplied from uninterruptible power supply apparatus 1.

Uninterruptible power supply apparatus 1 further includes electromagnetic contactors 2, 6, 8, 10, current detectors CD1 to CD3, capacitors C1 to C3, reactors L1 to L3, a converter 3, a DC line 4, a bidirectional chopper 5, an inverter 7, a semiconductor switch 9, an operation unit 11, and a controller 12.

Electromagnetic contactor 2 and reactor L1 are connected in series between AC input terminal T1 and an AC node 3a of converter 3. Electromagnetic contactor 2 is controlled by controller 12. When AC power is normally supplied from commercial AC power supply 51 (during normal operation of commercial AC power supply 51), electromagnetic contactor 2 is turned on. When AC power from commercial AC power supply 51 is no longer supplied normally (during power failure of commercial AC power supply 51), electromagnetic contactor 2 is turned off. Current detector CD1 detects a current I1 flowing between commercial AC power supply 51 and converter 3 and outputs a signal I1f indicative of a detected value to controller 12.

An instantaneous value of an AC input voltage VI that appears at a node N1 between electromagnetic contactor 2 and reactor L1 is detected by controller 12. Controller 12 determines whether a power failure has occurred based on a detected value of AC input voltage VI. Controller 12 also controls converter 3 or the like in synchronization with AC input voltage VI.

Capacitor C1 is connected to node N1. Capacitor C1 and reactor L1 constitute an AC filter F1. AC filter F1, which is a low-pass filter, causes AC power of commercial frequency to pass from commercial AC power supply 51 to converter 3 and prevents a signal of switching frequency that is generated in converter 3 from passing to commercial AC power supply 51.

Converter 3, which is a well-known converter including a plurality of transistors and a plurality of diodes, is controlled by controller 12. During normal operation of commercial AC power supply 51, converter 3 converts AC power into DC power and outputs the DC power to DC line 4. An output voltage of converter 3 is controllable to a desired value.

During power failure of commercial AC power supply 51, an operation of converter 3 is stopped. Capacitor C2 is connected to DC line 4 and smooths a voltage of DC line 4. An instantaneous value of a DC voltage VD that appears in DC line 4 is detected by controller 12.

During normal operation of commercial AC power supply 51, controller 12 controls converter 3 such that DC voltage VD of DC line 4 is equal to a reference voltage VDR (first reference voltage). AC filter F1 and converter 3 constitute an example first power converter that converts AC power into DC power.

DC line 4 is connected to a high-voltage-side node 5a of bidirectional chopper 5, and a low-voltage-side node 5b of bidirectional chopper 5 is connected to battery terminal T3 via reactor L2 and electromagnetic contactor 6. Electromagnetic contactor 6 is turned on during use of uninterruptible power supply apparatus 1 and is turned off, for example, during maintenance of uninterruptible power supply apparatus 1 and battery 53. Reactor L2 smooths a current I2 flowing between bidirectional chopper 5 and battery 53.

Bidirectional chopper 5, which is a well-known bidirectional chopper including a plurality of transistors and a plurality of diodes, is controlled by controller 12. During normal operation of commercial AC power supply 51, bidirectional chopper 5 stores DC power generated by converter 3 in battery 53. During power failure of commercial AC power supply 51, bidirectional chopper 5 supplies DC power of battery 53 to inverter 7 via DC line 4.

When DC power is stored in battery 53, bidirectional chopper 5 steps down DC voltage VD of DC line 4 and supplies DC voltage VD to battery 53. When DC power of battery 53 is supplied to inverter 7, bidirectional chopper 5 steps up a terminal-to-terminal voltage VB of battery 53 and outputs terminal-to-terminal voltage VB to DC line 4.

Current detector CD2 detects current I2 flowing between bidirectional chopper 5 and battery 53 and outputs a signal I2f, indicative of a detected value, to controller 12. An instantaneous value of terminal-to-terminal voltage VB of battery 53 that appears at battery terminal T3 is detected by controller 12.

Controller 12 controls, during normal operation of commercial AC power supply 51, bidirectional chopper 5 such that battery voltage VB is equal to a reference voltage VBR (second reference voltage) and controls, during power failure of commercial AC power supply 51, bidirectional chopper 5 such that DC voltage VD of DC line 4 is equal to reference voltage VDR. Bidirectional chopper 5 and reactor L2 constitute an example second power converter that provides and receives DC power between DC line 4 and battery 53. DC line 4 is connected to a DC node of inverter 7.

Inverter 7, which is a well-known inverter including a plurality of transistors and a plurality of diodes, is controlled by controller 12. Inverter 7 converts DC power supplied from converter 3 or bidirectional chopper 5 via DC line 4 into AC power of commercial frequency and outputs the AC power to an output node 7a.

In other words, inverter 7 converts DC power supplied from converter 3 via DC line 4 into AC power during normal operation of commercial AC power supply 51 and converts DC power supplied from battery 53 via bidirectional chopper 5 into AC power during power failure of commercial AC power supply 51. An output voltage of inverter 7 is controllable to a desired value.

Output node 7a of inverter 7 is connected to a first terminal (node N2) of electromagnetic contactor 8 via reactor L3, and a second terminal of electromagnetic contactor 8 is connected to AC output terminal T4. Capacitor C3 is connected to node N2. Reactor L3 and capacitor C3 constitute an AC filter F2. AC filter F2, which is a low-pass filter, causes AC power of commercial frequency generated in inverter 7 to pass to AC output terminal T4 and prevents a signal of switching frequency generated in inverter 7 from passing to AC output terminal T4.

Electromagnetic contactor 8 is controlled by controller 12 to be turned on during an inverter feeding mode in which AC power generated by inverter 7 is supplied to load 54 and turned off during a bypass feeding mode in which AC power from bypass AC power supply 52 is supplied to load 54.

An instantaneous value of an AC output voltage VO that appears at node N3 is detected by controller 12. Current detector CD3 detects a current I3 flowing between inverter 7 and load 54 and supplies a signal I3f, indicative of a detected value, to controller 12.

Controller 12 controls inverter 7 such that AC output voltage VO is equal to a sinusoidal reference voltage VOR. Inverter 7 and AC filter F2 constitute an example third power converter that converts DC power into AC power.

Semiconductor switch 9 includes a pair of thyristors connected in anti-parallel with each other and is connected between bypass input terminal T2 and AC output terminal T4. Electromagnetic contactor 10 is connected in parallel with semiconductor switch 9. Semiconductor switch 9 is controlled by controller 12 to be turned off during normal operation, and in the event of a failure of inverter 7, instantaneously turned on and supply AC power from bypass AC power supply 52 to load 54. Semiconductor switch 9 turns off after a lapse of a predetermined period of time from turning-on.

Electromagnetic contactor 10 is turned off in the inverter feeding mode in which AC power generated by inverter 7 is supplied to load 54 and is turned on in the bypass feeding mode in which AC power from bypass AC power supply 52 is supplied to load 54. Also, in the event of a failure of inverter 7, electromagnetic contactor 10 is turned on and supplies AC power from bypass AC power supply 52 to load 54. In other words, in the event of a failure of inverter 7, semiconductor switch 9 is instantaneously turned on for a predetermined period of time, and electromagnetic contactor 10 is turned on. This is for preventing semiconductor switch 9 from being overheated by a current to be broken.

Operation unit 11 includes a plurality of buttons operated by the user of uninterruptible power supply apparatus 1, an image display unit that displays various pieces of information, and the like. As the user operates operation unit 11, the power of uninterruptible power supply apparatus 1 can be turned on and off, and any mode of the bypass feeding mode and the inverter feeding mode can be selected.

Also, as the user operates operation unit 11 (setting unit), various pieces of information can be stored in controller 12. The various pieces of information include reference voltage VBR used when battery 53 is charged. Reference voltage VBR includes a reference voltage VF for the floating charge of battery 53 and a reference voltage Ve for the equalizing charge of battery 53.

The various pieces of information also include a mathematical expression or a table indicating the relationship between reference voltage VDR and reference voltage VBR. Further, the various pieces of information include a cycle TE1 and an execution time TE2 for the equalizing charge of battery 53.

Controller 12 calculates reference voltage VDR based on reference voltage VBR set with operation unit 11 and the mathematical expression or table indicating the relationship between reference voltages VDR, VBR. Reference voltage VDR has a value corresponding to reference voltage VBR within the range higher than reference voltage VBR, higher than twice the amplitude of AC output voltage VO, and lower than a maximum value of reference voltage VDR. This will be described below in detail.

Controller 12 also controls the entire uninterruptible power supply apparatus 1 based on AC input voltage VI, AC input current I1, DC voltage VD, battery voltage VB, battery current I2, AC output voltage VO, AC output current I3, reference voltages VDR, VBR, VOR, a signal from operation unit 11, and the like.

Figure 2:
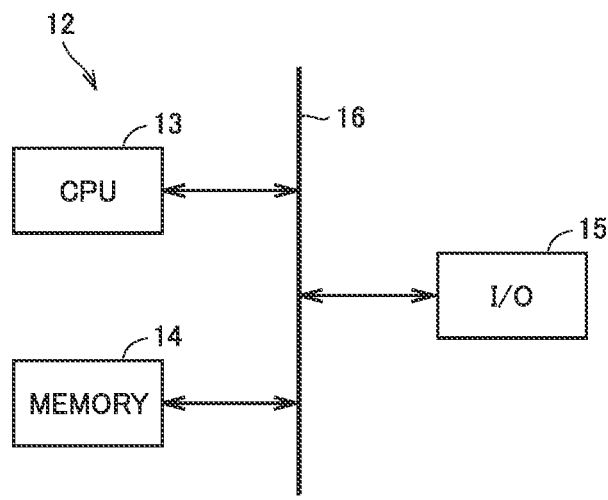
FIG. 2 is a block diagram showing an example hardware configuration of a controller shown in FIG. 1.

FIG. 2 is a block diagram showing an example hardware configuration of controller 12. Typically, controller 12 can be a microcomputer with a pre-stored predetermined program.

In the example of FIG. 2, controller 12 includes a central processing unit (CPU) 13, a memory 14, and an input/output (I/O) circuit 15. CPU 13, memory 14, and I/O circuit 15 can provide and receive data with one another via bus 16. A program is stored in part of the area of memory 14, and as CPU 13 executes the program, various functions, which will be described below, can be executed. I/O circuit 15 receives and outputs a signal and data from and to the outside of controller 12.

Alternatively, at least part of controller 12 may be a circuit such as a field programmable gate array (FPGA) or an application specific integrated circuit (ASIC), unlike the example of FIG. 2. Alternatively, at least part of controller 12 can be an analog circuit.

Figure 3:
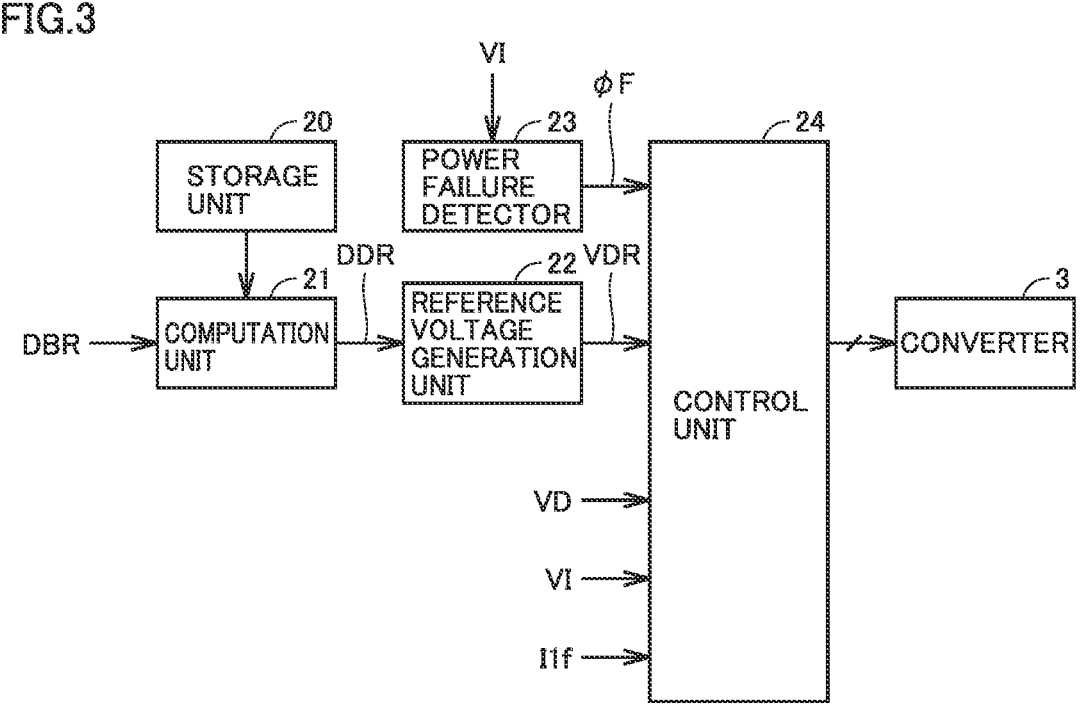
FIG. 3 is a block diagram showing a configuration of a portion of the controller shown in FIG. 1 that relates to control of the converter.

FIG. 3 is a block diagram showing a configuration of a portion of controller 12 that relates to control of converter 3. In FIG. 3, controller 12 includes a storage unit 20, a computation unit 21, a reference voltage generation unit 22 (first reference voltage generation unit), a power failure detector 23, and a control unit 24 (first control unit). The function of each block shown in FIG. 3 can be implemented by at least one of software processing and hardware processing by controller 12.

Figure 5:
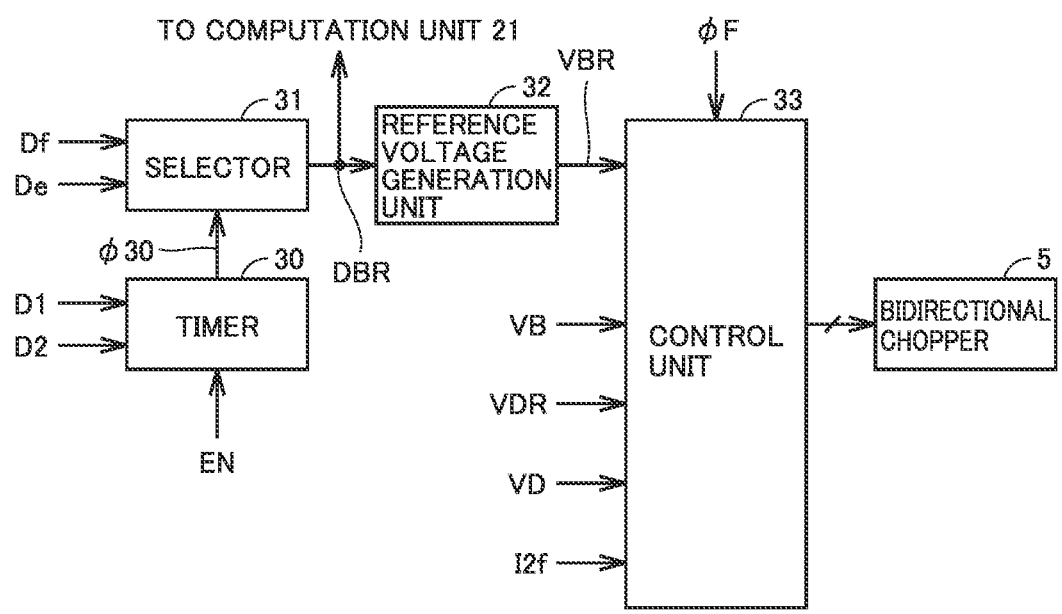
FIG. 5 is a block diagram showing a configuration of a portion of the controller shown in FIG. 1 that relates to control of a bidirectional chopper.

Storage unit 20 stores a mathematical expression (or a table) indicating the relationship between reference voltage VBR and reference voltage VDR. Computation unit 21 calculates reference voltage VDR of a value corresponding to reference voltage VBR based on a signal DBR indicative of reference voltage VBR and the mathematical expression (or the table) within storage unit 20, and outputs a signal DDR indicative of a value of the calculated reference voltage VDR to reference voltage generation unit 22. Reference voltage generation unit 22 generates reference voltage VDR of a value indicated by signal DDR and provides reference voltage VDR to control unit 24. Signal DBR indicative of reference voltage VBR will be described below (FIG. 5).

Figure 4:
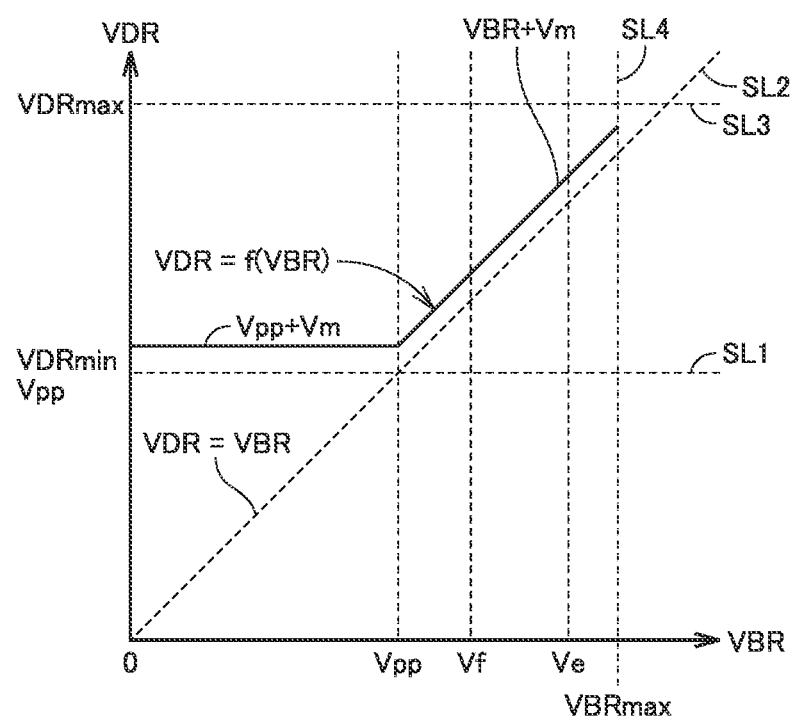
FIG. 4 is a diagram for describing a mathematical expression (or a table) stored in a storage unit shown in FIG. 3.

FIG. 4 shows the relationship between reference voltage VBR and reference voltage VDR. In FIG. 4, the horizontal axis represents reference voltage VBR, and the vertical axis represents reference voltage VDR. Reference voltage VDR varies according to reference voltage VBR within the range higher than voltage Vpp twice the amplitude of AC voltage VO (VDR>Vpp), higher than reference voltage VBR (VDR>VBR), and lower than maximum value VDRmax of reference voltage VDR (VDR<VDRmax).

FIG. 4 shows how VDR varies according to VBR along straight lines SL1, SL2, within the range surrounded by a straight line SL1, indicative of VDR=Vpp, a straight line SL2, indicative of VDR=VBR, a straight line SL3, indicative of VDR=VDRmax, a straight line SL4, indicative of VBR=VBRmax, and a straight line (vertical axis), indicative of VBR=0.

The reason for VDR>Vpp is that inverter 7 fails to generate a sinusoidal AC voltage VO if DC voltage VD is lower than voltage Vpp twice the amplitude of AC voltage VO (VDR<Vpp). The reason for VDR>VBR is that bidirectional chopper 5 is configured to step down DC voltage VD and supply DC voltage VD to battery 53 during normal operation of commercial AC power supply 51 and step up battery voltage VB and supply battery voltage VB to DC line 4 during power failure of commercial AC power supply 51.

The reason for VDR<VDRmax is to increase the efficiency of uninterruptible power supply apparatus 1. In other words, reference voltage VDR has conventionally been fixed at maximum value VDRmax (VDR=VDmax) to generate a sinusoidal AC voltage VO and enable charging of several types of batteries 53 (such as a lead storage battery and a lithium-ion battery). Reference voltage VDR=VDRmax is a maximum value of DC voltage VD that enables stable output of converter 3.

However, increasing DC voltage VD (i.e., reference voltage VDR) increases a switching loss of each transistor of converter 3, bidirectional chopper 5, and inverter 7, resulting in reduced efficiency of uninterruptible power supply apparatus 1. In the present embodiment, thus, reference voltage VDR is set to a value lower than maximum value VDRmax to reduce a switching loss of a transistor, resulting in higher efficiency of uninterruptible power supply apparatus 1.

The user of uninterruptible power supply apparatus 1 uses operation unit 11 to set the value of reference voltage VBR. Reference voltage VBR is determined according to the type of battery 53. Since VDR>Vpp is required, VDR=Vpp+Vm in the area of VBR≤ Vppm, where Vm is a predetermined margin voltage. VDR=Vpp+Vm is equal to a minimum value VDRmin of reference voltage VDR.

Since VDR>VBR is required, VDR=VBR+Vm in the area of VBR>Vpp. Here, VDR<VDRmax, and accordingly, VBRmax is set such that VBRmax+Vm<VDRmax. Thus, reference voltage VDR is a function of reference voltage VBR and is expressed as VDR=f(VBR) because once the value of reference voltage VBR is determined, the value of reference voltage VDR is determined accordingly.

For example, when reference voltage VBR is a voltage Vf required for the floating charge of battery 53 and Vpp<Vf, VDR=Vf+Vm. When reference voltage VBR is a voltage Ve required for the equalizing charge of battery 53 and Vf<Ve<VBRmax, VDR=Ve+Vm.

Referring again to FIG. 3, power failure detector 23 detects whether a power failure of commercial AC power supply 51 has occurred based on AC voltage VI supplied from commercial AC power supply 51, and outputs a signal OF indicating a detection result. During normal operation of commercial AC power supply 51, a power failure detection signal φF is brought into "H" level, which is a deactivation level. In the event of a power failure of commercial AC power supply 51, power failure detection signal OF is brought into "L" level, which is an activation level. For example, power failure detector 23 determines that a power failure of commercial AC power supply 51 has occurred when AC voltage VI falls below a lower limit.

Control unit 24 controls converter 3 based on power failure detection signal OF from power failure detector 23, reference voltage VDR from reference voltage generation unit 22, DC voltage VD of DC line 4, AC voltage VI from commercial AC power supply 51, AC input current I1 indicated by output signal I1f of current detector CD1, and the like.

When power failure detection signal OF is at "H" level that is the deactivation level (during normal operation of commercial AC power supply 51), control unit 24 controls converter 3 such that DC voltage VD is equal to reference voltage VDR. When power failure detection signal OF is at "L" level that is the activation level (during power failure of commercial AC power supply 51), control unit 24 stops an operation of converter 3.

FIG. 5 is a block diagram showing a configuration of a portion of controller 12 that relates to control of bidirectional chopper 5. In FIG. 5, controller 12 includes a timer 30, a selector 31, a reference voltage generation unit 32 (second reference voltage generation unit), and a control unit 33 (second control unit). The function of each block shown in FIG. 5 can be implemented by at least one of software processing and hardware processing by controller 12.

The user of uninterruptible power supply apparatus 1 uses operation unit 11 (setting unit) to set reference voltage VBR=Vf (first auxiliary reference voltage) when the floating charge of battery 53 is performed and set reference voltage VBR=Ve (second auxiliary reference voltage) when the equalizing charge of battery 53 is performed. Operation unit 11 outputs a signal Df, indicative of the set reference voltage VBR=Vf, and a signal De, indicative of the set reference voltage VBR=Ve, to selector 31.

The user of uninterruptible power supply apparatus 1 also uses operation unit 11 to set cycle TE1 for the equalizing charge of battery 53 and a period of time TE2 for the equalizing charge. Operation unit 11 outputs a signal D1, indicative of the set cycle TE1, and a signal D2, indicative of the set time TE2, to timer 30.

The user of uninterruptible power supply apparatus 1 also uses operation unit 11 to instruct start and stop of timer 30. Operation unit 11 brings signal EN into "H" level that is the activation level when start of timer 30 is instructed and brings signal EN into "L" level that is the deactivation level when stop of timer 30 is instructed.

When signal EN is at "L" level that is the deactivation level, timer 30 is deactivated, and an output signal φ30 of timer 30 is maintained at "L" level. When signal EN is raised from "L" level to "H" level, timer 30 is activated to start time measurement.

Timer 30 raises signal φ30 from "L" level to "H" level every time a period of time TE1 (e.g., 24 hours), indicated by signal D1, elapses, and lowers signal ¢30 from "H" level to "L" level after a lapse of period of time TE2 (e.g., one hour), indicated by signal D2. Signal φ30 raised to "H" level is a command signal for instructing execution of the equalizing charge of battery 53.

Selector 31 receives signal Df indicative of reference voltage VBR=Vf from operation unit 11 and signal De indicative of reference voltage VBR=Ve, and according to output signal φ30 of timer 30, outputs any one of signal Df and signal De as signal DBR indicative of reference voltage VBR.

When output signal φ30 of timer 30 is at "L" level, selector 31 selects signal Df and outputs signal Df as signal DBR. When output signal φ30 of timer 30 is at "H" level, selector 31 selects signal De and outputs signal De as signal DBR. Output signal DBR of selector 31 is supplied to computation unit 21 (FIG. 3) and also to reference voltage generation unit 32.

Reference voltage generation unit 32 generates reference voltage VBR of a value indicated by output signal DBR of selector 31 and outputs reference voltage VBR to control unit 33. When output signal DBR of selector 31 is signal Df, reference voltage Vf of a value indicated by signal Df is output as reference voltage VBR. When output signal DBR of selector 31 is signal De, reference voltage Ve of a value indicated by signal De is output as reference voltage VBR.

Depending on the type of battery 53, only the floating charge may be performed, and the equalizing charge may not be performed. In this case, signal EN is fixed at "L" level, output signal φ30 of timer 30 is fixed at "L" level, selector 31 selects only signal Df, and reference voltage generation unit 32 generates only reference voltage VBR=Vf.

Control unit 33 controls bidirectional chopper 5 based on power failure detection signal φF from power failure detector 23, reference voltage VBR from reference voltage generation unit 32, battery voltage VB, reference voltage VDR from reference voltage generation unit 22, DC voltage VD of DC line 4, battery current I2 indicated by output signal I2f of current detector CD2, and the like.

When power failure detection signal φF is at "H" level that is the deactivation level (during normal operation of commercial AC power supply 51), control unit 33 controls bidirectional chopper 5 such that battery voltage VB is equal to reference voltage VBR. When power failure detection signal φF is at "L" level that is the activation level (during power failure of commercial AC power supply 51), control unit 33 controls bidirectional chopper 5 such that DC voltage VD is equal to reference voltage VDR.

Figure 6:
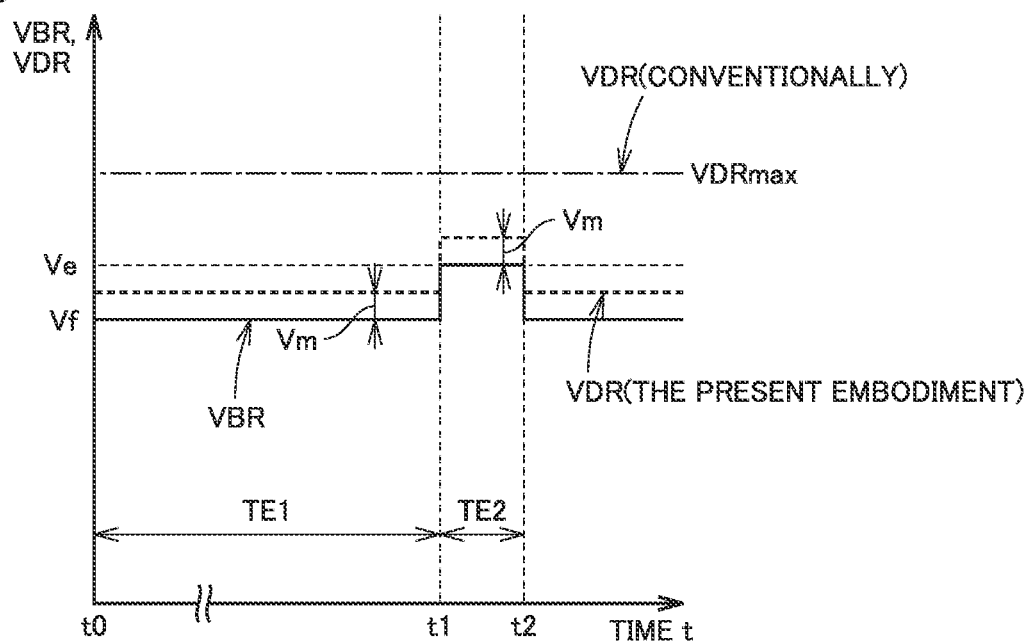
FIG. 6 is a time chart showing waveforms of a reference voltage VBR shown in FIG. 5 and a reference voltage VDR shown in FIG. 3.

FIG. 6 is a time chart showing waveforms of reference voltage VBR (FIG. 5) and reference voltage VDR (FIG. 3). In FIG. 6, at a time t0, signal EN is raised from "L" level to "H" level, output signal φ30 of timer 30 (FIG. 5) is brought into "L" level, signal Df is selected by selector 31, and reference voltage VBR=Vf is generated by reference voltage generation unit 32, where Vpp<Vf (FIG. 4). Since Vpp<Vf, reference voltage VDR=Vf+Vm is generated by computation unit 21 and reference voltage generation unit 22 (FIG. 3).

Converter 3 is controlled by control unit 24 (FIG. 3) such that DC voltage VD of DC line 4 is equal to reference voltage VDR=Vf+Vm. Also, bidirectional chopper 5 is controlled by control unit 33 (FIG. 5) such that battery voltage VB is equal to reference voltage VBR=Vf, and the floating charge of battery 53 is performed.

After period of time TE1 elapses from time t0, at a time t1, output signal φ30 of timer 30 is raised from "L" level to "H" level, signal De is selected by selector 31, reference voltage VBR=Ve is generated by reference voltage generation unit 32, where Vpp<Vf<Ve (FIG. 4). Since Vpp<Vf<Ve, reference voltage VDR=Ve+Vm is generated by computation unit 21 and reference voltage generation unit 22 (FIG. 3).

Converter 3 is controlled by control unit 24 (FIG. 3) such that DC voltage VD of DC line 4 is equal to reference voltage VDR=Ve+Vm. Also, bidirectional chopper 5 is controlled by control unit 33 (FIG. 5) such that battery voltage VB is equal to reference voltage VBR=Ve, and the equalizing charge of battery 53 is performed.

After period of time TE2 elapses from time t1, at a time t2, output signal φ30 of timer 30 is raised from "H" level to "L" level, signal Df is selected by selector 31, reference voltage VBR=Vf is generated by reference voltage generation unit 32, reference voltage VDR=Vf+Vm is generated by computation unit 21 and reference voltage generation unit 22, and the floating charge of battery 53 is started again.

Conventionally, reference voltage VDR has been fixed at maximum value VDRmax as indicated by the alternate long and short dash line in FIG. 6, and thus, DC voltage VD has been high and the efficiency of the uninterruptible power supply apparatus has been low. Contrastingly, in the present embodiment, reference voltage VDR is set to a voltage (e.g., Vf+Vm, Ve+Vm) lower than maximum value VDRmax, and thus, the efficiency of uninterruptible power supply apparatus 1 can be improved.

Figure 7:
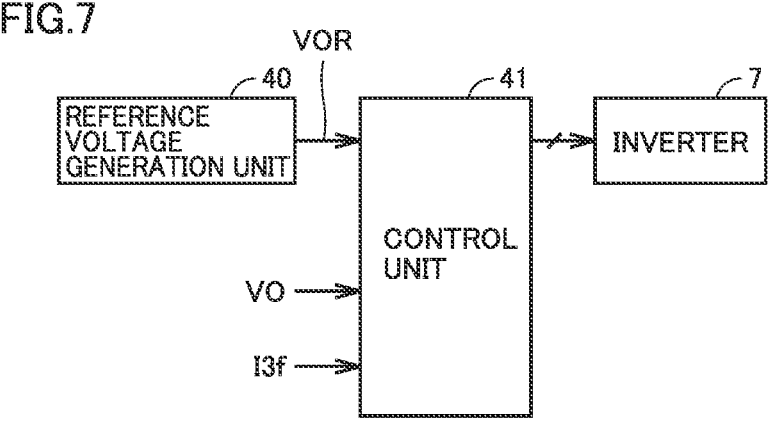
FIG. 7 is a block diagram showing a configuration of a portion of the controller shown in FIG. 1 that relates to control of an inverter.

FIG. 7 is a block diagram showing a configuration of a portion of controller 12 that relates to control of inverter 7. In FIG. 7, controller 12 includes a reference voltage generation unit 40 and a control unit 41. The function of each block shown in FIG. 7 can be implemented by at least one of software processing and hardware processing by controller 12. Reference voltage generation unit 40 generates a sinusoidal reference voltage VOR. Reference voltage VOR has a commercial frequency. Since voltage Vpp twice the amplitude of reference voltage VOR is lower than minimum value VDRmin of reference voltage VDR (FIG. 4), a sinusoidal reference voltage VOR can be generated.

Control unit 41 controls inverter 7 based on reference voltage VOR from reference voltage generation unit 40, AC output voltage VO, current I3 indicated by output signal I3f of current detector CD3, and the like. Control unit 41 controls inverter 7 such that AC output voltage VO is equal to reference voltage VOR.

Next, an operation of this uninterruptible power supply apparatus will be described. During normal operation of commercial AC power supply 51, electromagnetic contactors 2, 6, 8 (FIG. 1) are turned on, and semiconductor switch 9 and electromagnetic contactor 10 are turned off. AC power is supplied from commercial AC power supply 51 via electromagnetic contactor 2 and AC filter F1 to converter 3, and the AC power is converted into DC power by converter 3.

The DC power generated by converter 3 is stored in battery 53 via bidirectional chopper 5, reactor L2, and electromagnetic contactor 6, is converted into AC power by inverter 7, and is supplied to load 54 via AC filter F2 and electromagnetic contactor 8.

During normal operation of commercial AC power supply 51, the floating charge and the equalizing charge of battery 53 are performed alternately. During the floating charge, reference voltage VBR=Vf is generated by reference voltage generation unit 32 (FIG. 5), and battery voltage VB is made equal to reference voltage VBR=Vf by bidirectional chopper 5. Also, reference voltage VDR=Vf+Vm of a value corresponding to reference voltage VBR=Vf is generated by reference voltage generation unit 22 (FIG. 3), and DC voltage VD is made equal to reference voltage VDR=Vf+Vm by converter 3.

During the equalizing charge, reference voltage VBR=Ve is generated by reference voltage generation unit 32 (FIG. 5), and battery voltage VB is made equal to reference voltage VBR=Ve by bidirectional chopper 5. Also, reference voltage VDR=Ve+Vm of a value corresponding to reference voltage VBR=Ve is generated by reference voltage generation unit 22 (FIG. 3), and DC voltage VD is made equal to reference voltage VDR=Ve+Vm by converter 3.

In the event of a power failure of commercial AC power supply 51, an operation of converter 3 is stopped, and electromagnetic contactor 2 is turned off. Also, DC power of battery 53 is supplied to inverter 7 by electromagnetic contactor 6, reactor L2, and bidirectional chopper 5, and is converted into AC power.

During power failure, reference voltage VBR is generated by reference voltage generation unit 32 (FIG. 5), reference voltage VDR of a value corresponding to reference voltage VBR is generated by reference voltage generation unit 22 (FIG. 3), and DC voltage VD is made equal to reference voltage VDR by bidirectional chopper 5.

The AC power generated by inverter 7 is supplied to load 54 via AC filter F2 and electromagnetic contactor 8. Thus, even in the event of a power failure of commercial AC power supply 51, an operation of load 54 can be continued during a period in which DC power is stored in battery 53.

During normal operation of commercial AC power supply 51, if inverter 7 fails, semiconductor switch 9 is instantaneously turned on, and AC power is supplied from bypass AC power supply 52 to load 54 via semiconductor switch 9. Subsequently, electromagnetic contactor 10 is turned on, electromagnetic contactor 8 is turned off, and semiconductor switch 9 is turned off. Consequently, AC power is supplied from bypass AC power supply 52 to load 54 via electromagnetic contactor 10.

As described above, in the present embodiment, reference voltage VDR higher than reference voltage VBR set using operation unit 11 and lower than maximum value VDRmax of reference voltage VDR is generated and supplied to control unit 24. As a result, voltage VD (i.e., reference voltage VDR) of DC line 4 can be made lower than maximum value VDRmax, and a switching loss of each transistor of converter 3, bidirectional chopper 5, and inverter 7 can be reduced for improved efficiency of uninterruptible power supply apparatus 1. Also, voltage VD of DC line 4 can be reduced for longer life of capacitor C2.

It should be understood that the embodiments disclosed herein are illustrative and non-restrictive in every respect. The scope of the present invention is defined by the scope of the claims, rather than the embodiments described above, and is intended to include any modifications within the scope and meaning equivalent to the scope of the claims.

REFERENCE SIGNS LIST 1 uninterruptible power supply apparatus; T1 AC input terminal; T2 bypass input terminal; T3 battery terminal; T4 AC output terminal; 2, 6, 8, 10 electromagnetic contactor; CD1-CD3 current detector; C1-C3 capacitor; L1-L3 reactor; 3 converter; 4 DC line; 5 bidirectional chopper; 7 inverter; 9 semiconductor switch; 11 operation unit; 12 controller; 13 CPU; 14 memory; 15 I/O circuit; 16 bus; 20 storage unit; 21 computation unit; 22, 32, 40 reference voltage generation unit; 23 power failure detector; 24, 33, 41 control unit; 30 timer; 31 selector; 51 commercial AC power supply; 52 bypass AC power supply; 53 battery; 54 load.

The invention claimed is:

1. An uninterruptible power supply apparatus comprising:
a first power converter that converts AC power supplied from an AC power supply into DC power and supplies the DC power to a DC line;
a second power converter that provides and receives DC power between the DC line and a power storage device;
a third power converter that converts DC power received from the DC line into AC power and supplies the AC power to a load;
a first control unit that
during normal operation of the AC power supply, controls the first power converter such that a DC voltage of the DC line is equal to a first reference voltage, and
during power failure of the AC power supply, causes the first power converter to stop operating;
a second control unit that
during normal operation of the AC power supply, controls the second power converter such that a terminal-to-terminal voltage of the power storage device is equal to a second reference voltage, and
during power failure of the AC power supply, controls the second power converter such that the DC voltage is equal to the first reference voltage;
a third control unit that controls the third power converter to output an AC voltage;
a setting unit for setting the second reference voltage;
a computation unit that calculates the first reference voltage higher than the second reference voltage set by the setting unit and lower than a maximum value of the first reference voltage;
a first reference voltage generation unit that generates the first reference voltage calculated by the computation unit and supplies the first reference voltage to the first control unit; and
a second reference voltage generation unit that generates the second reference voltage set by the setting unit and supplies the second reference voltage to the second control unit.

2. The uninterruptible power supply apparatus according to claim 1, wherein the computation unit calculates the first reference voltage higher than the second reference voltage set by the setting unit, higher than twice an amplitude of the AC voltage output from the third power converter, and lower than the maximum value of the first reference voltage.

3. The uninterruptible power supply apparatus according to claim 1, wherein the computation unit calculates the first reference voltage based on the second reference voltage set by the setting unit and a mathematical expression or a table indicating a relationship between the first reference voltage and the second reference voltage.

4. The uninterruptible power supply apparatus according to claim 1, wherein
the second reference voltage includes
a first auxiliary reference voltage for a floating charge of the power storage device, and
a second auxiliary reference voltage for an equalizing charge of the power storage device, and
the second reference voltage generation unit
outputs the first auxiliary reference voltage as the second reference voltage when the floating charge is performed, and
outputs the second auxiliary reference voltage as the second reference voltage when the equalizing charge is performed.

5. The uninterruptible power supply apparatus according to claim 4, further comprising a timer that outputs a command signal for instructing execution of the equalizing charge for a predetermined period of time in a predetermined cycle,
wherein the second reference voltage generation unit outputs the first auxiliary reference voltage as the second reference voltage when the command signal is not output from the timer, and outputs the second auxiliary reference voltage as the second reference voltage when the command signal is output from the timer.

\* \* \* \* \*